UNITED STATES PATENT OFFICE.

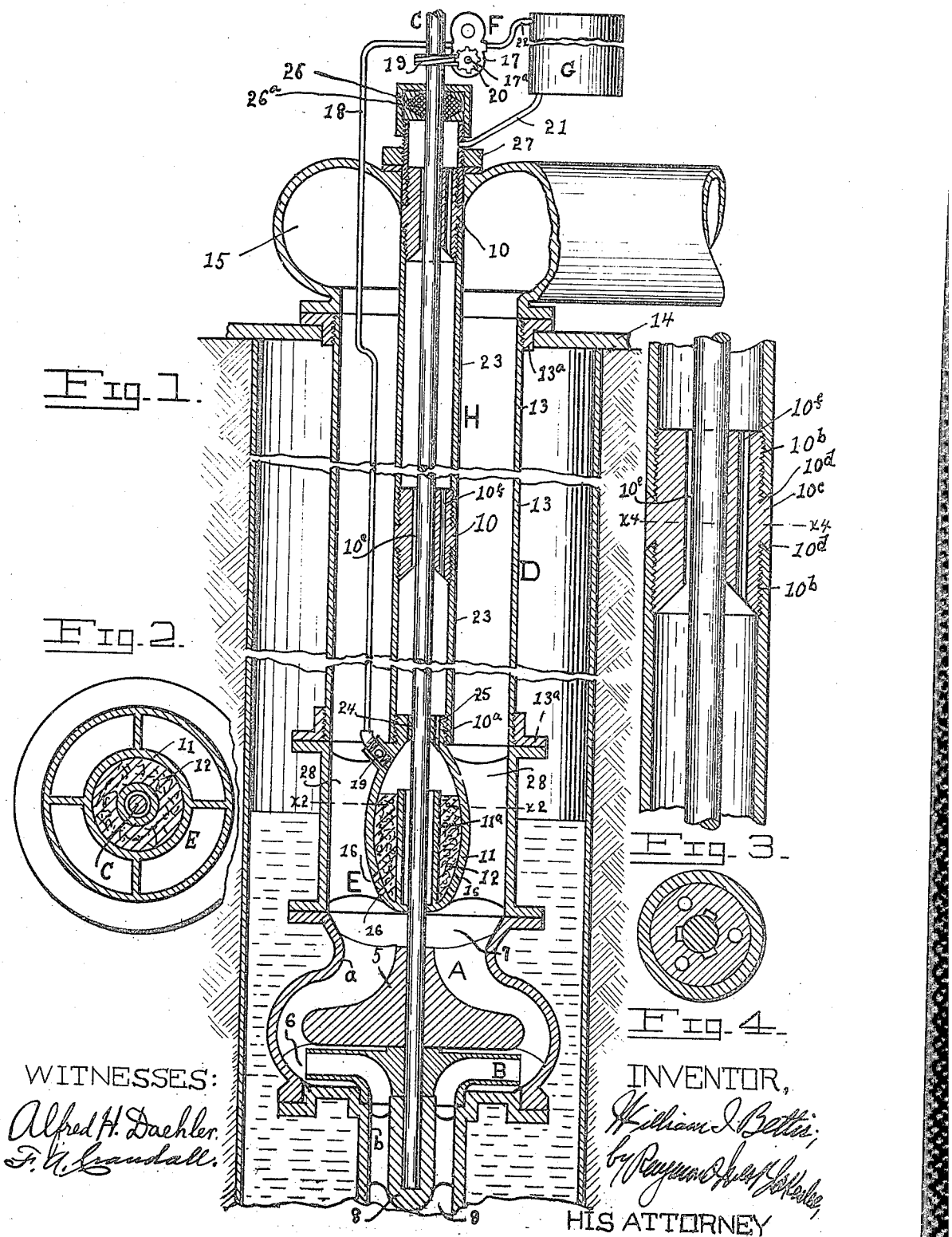

WILLIAM I. BETTIS, OF LOS ANGELES, CALIFORNIA, ASSIGNOR OF ONE-HALF TO WESTERN WELL WORKS, OF SAN FRANCISCO, CALIFORNIA, A CORPORATION OF CALIFORNIA.

LUBRICATING SYSTEM.

1,239,452.   Specification of Letters Patent.   Patented Sept. 11, 1917.

Application filed September 17, 1915. Serial No. 51,161.

*To all whom it may concern:*

Be it known that I, WILLIAM I. BETTIS, a citizen of the United States, residing at Los Angeles, in the county of Los Angeles and State of California, have invented new and useful Improvements in Lubricating Systems, of which the following is a specification.

This invention relates to lubricating systems, and more particularly to lubricating systems for submerged shafts. In deep well pumps and other apparatus where it is necessary to employ a submerged shaft to transmit the power necessary for operating such apparatus, it is ordinarily difficult to provide for the proper lubrication of the submerged portions of such shafts, and many attempts have been made to keep the bearings well lubricated, as for instance, by placing the shaft bearings and shaft in a closed tube which is supplied with lubricant at its top end, but it is evident that if any of the water or other liquid in which the apparatus is submerged finds its way into the tube it is impossible to lubricate any but the upper bearings because of the difference in specific gravity of the lubricant and the intruding liquid, and in all such known devices the tube must be absolutely free from water to render possible the lubrication of the lower bearings.

In accordance with the present invention, a rotatable shaft through which power is transmitted to the pump impeller or other submerged device or apparatus, is mounted in a series of suitable bearings spaced along such shaft, and conduits preferably extend from bearing to bearing, no attempt being made to prevent the ingress of water to the conduits, but on the contrary the free admission of water or other liquid to nearly fill the conduits, which is necessary for the proper operation of the system, is provided for, such water being the vehicle by means of which the lubricant is caused to successively traverse the series of bearings, beginning with the lowermost one. This progress of the lubricant past the series of bearings is due to the difference in specific gravity of such lubricant and the liquid, such as water, in which the apparatus is submerged, as upon introduction into the column of water in the conduits, the lubricant rises through the water and passes through suitable channels or ducts in the successive bearings visited in its ascent, until it reaches the top of the uppermost conduit, where it may be allowed to escape into a suitable receptacle, to be re-introduced into the water column at the lowermost bearing for re-traverse of the bearings. Upon rotation of the shaft a rotatory motion is imparted to the column of liquid and lubricant in the conduits, causing the separation of the water and lubricant, the water leaving the shaft and the lubricant ascending the shaft and sheathing the same, due to difference in specific gravity of the water and lubricant, thus insuring the proper lubrication of the bearings.

The invention has for further objects the provision of a system of the general character stated which will be relatively simple and inexpensive in construction and organization, when taken into consideration with positiveness of operation and high efficiency.

With the above and other objects in view, the invention consists in the novel and useful provision, formation, construction, combination, relative arrangement and interrelation and association of parts, members and features, all as hereinafter described, shown in the drawing and finally pointed out in claims.

In the drawing:

Figure 1 is a central vertical section through a centrifugal pump provided with a lubricating system organized, constructed and applied in accordance with the invention, the pump being shown as installed in a well hole with the impeller and other features thereof submerged;

Fig. 2 is an enlarged horizontal sectional view taken on the line $x^2$—$x^2$, Fig. 1;

Fig. 3 is an enlarged central vertical sectional view taken through one of the shaft bearings shown in Fig. 1; and, Fig. 4 is a horizontal sectional view taken on the line $x^4$—$x^4$, Fig. 3.

Corresponding parts in all the figures are designated by the same reference characters.

Referring with particularity to the drawing, in the embodiment of the invention therein shown, A designates the casing of a centrifugal pump, B designates the impeller thereof, C designates an operating shaft for the impeller, D designates a discharge pipe, E designates water inlet means for the lubricating system; F designates force-feed means for the lubricant, G designates a lubricant receptacle, and H designates conducting means for the lubricant and water of the lubricating system.

The pump casing A preferably comprises an upper casing member $a$ provided with a bearing 5 for the shaft C and having formed therein an impeller chamber 6 and a water discharge duct 7, and a lower casing member $b$ provided with a bearing 8 for the shaft C and having a water inlet duct 9 formed therein.

The impeller B may be of any preferred construction and is shown as mounted upon the operating shaft C between the bearings 5 and 8 provided in the casing A.

The operating shaft C is adapted to have power applied thereto at its upper end and extends downwardly to the impeller, being mounted in suitably spaced bearings 10 and $10^a$, the bearing $10^a$ being the lowermost of the series, and such bearing $10^a$ is formed with a depending shell 11 having an upstanding internal cylindrical wall $11^a$ which provides an annular space around the shaft C, a filtering medium 12, of the water inlet means E being disposed between said upstanding wall $11^a$ and the outer wall of the shell 11. The shell has orifices, also of the water inlet means E, formed therein, as will be hereinafter described, so as to provide, in effect, an end for the conducting means H which is open to the water. The shaft bearings 10 are preferably each formed with exteriorly threaded ends as at $10^b$ and provided with a circumferential outstanding flange $10^c$ which is undercut at both edges to provide angular shoulders $10^d$ under which the respective ends of pipe sections, comprised within the conducting means H, are fitted. The bearing $10^a$ is threaded at its upper end to take into the lowermost of such pipe sections.

The discharge pipe D leads from the discharge duct of the pump casing A to the mouth of the well and is preferably formed of pipe lengths or sections 13 flanged and joined as at $13^a$ and the pump may be suspended thereby from a cap plate 14 which covers the mouth of the well. A discharge head 15, through which the lubricating system extends, is provided above the cap plate 14.

The water inlet means E of the lubricating system preferably comprises the body of filtering medium 12, which may be of such substance or material as is required to properly filter the liquid in which the apparatus is submerged, to rid the liquid entering the lubrication system of any abrasives, and a plurality of orifices 16 provided in the shell 11 at such level that the water entering the conducting means of the system must traverse the filter material.

The force-feed means F for the lubricant preferably comprises a lubricant pump 17, shown as a gear pump, and a lubricant conveying pipe 18 extending from the pump 17 to a point in the shell 11, of the conducting means, slightly above the filtering medium and just below the bearing $10^a$, a spring pressed check valve 19 being provided at the point where the pipe communicates with the interior of the shell 11, such valve being adjusted so that the hydro-static pressure of the lubricant in the pipe 18 can not open it, but when the force feed apparatus is in operation, which will be during the operation of the pump, the valve will yield permitting the introduction of lubricant to the conducting means of the system. The pump may be driven from the shaft C through a gear 19 fixed upon the shaft C and a gear 20 fixed upon shaft $17^a$ of the gear pump 17 or from any other suitable power source.

The receptacle G comprises a tank connected by a pipe 21 with the upper end of the conducting means in such manner that the lubricant accumulating at the top end of the conducting means may enter the tank, this accumulation of lubricant being due to the difference in specific gravity of the water and lubricant. The lubricant is drawn from the tank by the pump through a pipe 22 for re-use in the bearings.

The conducting means H comprises a plurality of pipe or tube sections 23, ducts $10^e$ and $10^f$ through the bearings 10 which the pipe or tube is interrupted to receive, ducts 24 and 25 through the bearing $10^a$, and the shell 11 through which water is admitted to the system. The tube sections 23 are spaced apart by the introduction of the bearings between them, and such sections 23 are internally threaded to correspond to the threaded portions of the bearings. The uppermost of the sections extends through the discharge head and is externally threaded at the upper end where it terminates in a stuffing box 26 accommodating suitable packing $26^a$ for the shaft C. A nut 27 is threaded upon the pipe section below the stuffing box 25 and serves to properly adjust the conducting means. The shell 11, and lowermost bearing $10^a$ are shown as made integral with a joint or short length of the discharge pipe D, being positioned and supported centrally in such joint by vertical webs 28.

The lubricant sheath of the shaft acts as a protecting coating, preventing deterioration of the same.

The operation, method of use and advantages of the improved lubricating system will be readily understood from the foregoing description, taken in connection with the accompanying drawing and the following statement.

Upon rotation of the shaft C by power from any suitable source, the force-feed means of the lubricating system draws lubricant from the receptacle G and introduces the same below the bearing 10ª, into the water in conducting means, which in the embodiment of the invention shown, enters through the apertures 16 and filtering medium 12 of the shell 11 from the discharge pipe D in which the shell 11 is disposed. The lubricant rises through the water of the conducting means, passing through the ducts provided in the bearing 10ª, and lubricating the shaft C at such bearing, the ducts 24 providing for the efficient lubrication of the shaft C at this point, and the lubricant in further rising or circulating, due to the aforementioned difference in specific gravity of lubricant and water, successively visits and lubricates the bearings 10, the ducts 10ᵉ insuring thorough lubrication of the shaft C at each of such bearings 10. As the shaft C rotates, the water in the lubricating system will by centrifugal action be impelled outwardly to the walls of the pipe sections 23, and the lubricant will occupy the space next to the shaft C.

The ducts 25 through the bearing 10ª and the ducts 10ᶠ through the bearings 10 provide circulation passages in addition to the ducts 24 and 10ᵉ. Such lubricant as accumulates at the top of the conducting means will tend to rise into the receptacle G as the pipe 21 and arranged to provide a proper path for the lubricant ascending to the receptacle.

It is manifest that many variations in provision, construction, formation and interrelation of parts, members and features may be made, in departure from the specific disclosure of the foregoing description and the drawings, without departing from the spirit of the invention or a fair interpretation thereof.

Having thus disclosed my invention, I claim and desire to secure by Letters Patent:

1. In a lubricating system, a submerged shaft, lubricant conducting means open at one end to the liquid in which the shaft is submerged and adapted to confine lubricant introduced therein to a path of travel which includes a plurality of bearings for the shaft adapted to be successively traversed by the lubricant, and means for introducing lubricant into said conducting means; said lubricant conducting means including said bearings.

2. In a lubricating system, a submerged shaft, lubricant conducting means adapted to contain lubricant and a liquid of greater specific gravity than the lubricant and through which the lubricant will rise and traverse a bearing when introduced into said liquid below the bearing, and means for so introducing the lubricant; said lubricant conducting means including said bearing.

3. In a lubricating system, a submerged shaft, lubricant conducting means communicating at its lower end with the liquid in which the shaft is submerged and adapted to contain a body of such liquid through which the lubricant may rise and successively traverse a plurality of bearing for the shaft when the lubricant is introduced into said body of liquid below the bearings, and means for so introducing the lubricant; said lubricant conducting means including said bearings.

4. In a lubricating system, a submerged shaft, lubricant conducting means in which the shaft is in part disposed and which communicates at its lower end with the liquid in which the shaft is submerged and adapted to contain lubricant and a body of said liquid through which the lubricant may rise to traverse a bearing for the shaft, and means for introducing lubricant to said conducting means; said lubricant conducting means including said bearing.

5. In a lubricating system for the operating shaft of a submerged apparatus, said shaft, a lubricant conducting means in which the shaft lies in part and which is adapted to receive and contain liquid from the body of liquid in which the apparatus is submerged and adapted to receive lubricant at the lower portion thereof and in which rotary motion is imparted by the shaft to the liquid and lubricant so received to cause the separation thereof by centrifugal action as the lubricant rises through the liquid, and means for supplying the lubricant; said lubricant conducting means including a bearing for said shaft.

6. In a lubricating system for the operating shaft of submerged apparatus, said shaft a lubricant conducting means in which the shaft lies in part and which is adapted to receive and contain liquid from the body of liquid in which the apparatus is submerged and adapted to receive lubricant at the lower portion thereof and in which rotary motion is imparted by the shaft to the liquid and lubricant so received to cause the seperation thereof by centrifugal action as the lubricant rises through the liquid, and pressure means for supplying the lubricant; said lubricant conducting means including a bearing for said shaft.

7. In a lubricating system for the operating shaft of submerged apparatus, said shaft, a lubricant conducting means in which the shaft lies in part and which is adapted to receive and contain liquid from the body of liquid in which the apparatus is submerged and adapted to receive lubricant at the lower portion thereof and in which rotary motion is imparted by the shaft to the liquid and lubricant so received to cause the separation thereof by centrifugal action as the lubricant rises through the liquid, a lubricant receptacle connected with the upper end of said conducting means, and pressure means for introducing the lubricant into the conducting means; said lubricant conducting means including a bearing for said shaft.

8. In a lubricating system, a submerged shaft, lubricant conducting means adapted to contain lubricant and a liquid of greater specific gravity than the lubricant and through which the lubricant will rise and traverse a bearing when introduced into said liquid below the bearing, means for so introducing the lubricant, and a valve adapted to resist the introduction of lubricant by the hydrostatic pressure of the lubricant and adapted to yield when said means for introducing the lubricant is in operation; said lubricant conducting means including said bearing.

9. A bearing provided with a suitable shaft receiving bore, a circumferential outstanding shoulder undercut at both edges to accommodate the complementarily formed ends of pipe sections, and externally threaded portions at each end of said bearing.

In testimony whereof, I have signed my name to this specification in the presence of two subscribing witnesses.

WILLIAM I. BETTIS.

Witnesses:
 ALFRED H. DAEHLER,
 F. A. CRANDALL.

Copies of this patent may be obtained for five cents each, by addressing the "Commissioner of Patents, Washington, D. C."